US011677838B2

(12) United States Patent
Chen

(10) Patent No.: US 11,677,838 B2
(45) Date of Patent: Jun. 13, 2023

(54) ACQUISITION METHOD, APPARATUS, DEVICE AND STORAGE MEDIUM FOR APPLET DATA

(71) Applicant: BAIDU ONLINE NETWORK TECHNOLOGY (BEIJING) CO., LTD., Beijing (CN)

(72) Inventor: Du Chen, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 17/196,566

(22) Filed: Mar. 9, 2021

(65) Prior Publication Data
US 2021/0337030 A1 Oct. 28, 2021

(30) Foreign Application Priority Data
Apr. 28, 2020 (CN) .......................... 202010352015.X

(51) Int. Cl.
*H04L 67/141* (2022.01)
*H04L 67/60* (2022.01)
(52) U.S. Cl.
CPC ............ *H04L 67/141* (2013.01); *H04L 67/60* (2022.05)
(58) Field of Classification Search
CPC ........ H04L 67/141; H04L 67/32; H04L 67/60
(Continued)

(56) References Cited

U.S. PATENT DOCUMENTS 5,951,636 A * 9/1999 Zerber .................... H04L 51/00
709/202
6,424,991 B1 * 7/2002 Gish ......................... H04L 9/40
709/227
(Continued)

FOREIGN PATENT DOCUMENTS

| CN | 103546562 A | 1/2014 |
|---|---|---|
| CN | 106406966 A | 2/2017 |

(Continued)

OTHER PUBLICATIONS

Shibaev, S., G. Counsell, G. Cunningham, S. J. Manhood, N. Thomas-Davies, and J. Waterhouse. "MAST data acquisition system." Fusion engineering and design 81, No. 15-17 (2006): 1789-1793. (Year: 2006).*

(Continued)

*Primary Examiner* — Bryan Lee
(74) *Attorney, Agent, or Firm* — J.C. Patents

(57) ABSTRACT

The embodiments of the present application disclose an acquisition method, apparatus, device and storage medium for applet data, relating to the technical field of the IoT, which are specifically implemented by: establishing a network connection with a data server according to an interface address of the data server corresponding to the applet when a trigger operation for starting the applet is detected; sending a data request message to the data server directly through the pre-established network connection after the applet is started, and receiving, from the data server, a data response message that contains requested data. Therefore, excessive time consumption caused by failing to pre-establish network connection before the first data request is sent can be avoided, and the acquisition efficiency of applet data can be improved.

20 Claims, 4 Drawing Sheets

(58) Field of Classification Search
USPC .................................................. 709/217, 219
See application file for complete search history.

(56) References Cited

U.S. PATENT DOCUMENTS

| | | | | |
|---|---|---|---|---|
| 6,680,730 | B1* | 1/2004 | Shields | G06Q 10/10 |
| | | | | 345/169 |
| 6,748,367 | B1* | 6/2004 | Lee | G06Q 20/382 |
| | | | | 705/64 |
| 6,961,770 | B1 | 11/2005 | Ott | |
| 10,482,069 | B1* | 11/2019 | Barnes | G06F 11/1658 |
| 2002/0035597 | A1 | 3/2002 | Khodko | |
| 2003/0220989 | A1* | 11/2003 | Tsuji | G06F 16/9574 |
| | | | | 709/220 |
| 2008/0295110 | A1 | 11/2008 | Muscarella | |
| 2009/0299784 | A1* | 12/2009 | Guller | G06Q 20/10 |
| | | | | 705/39 |
| 2011/0093925 | A1* | 4/2011 | Krishnamoorthy | |
| | | | | G06F 21/6218 |
| | | | | 726/4 |
| 2012/0149302 | A1* | 6/2012 | Sekiya | H04L 63/0492 |
| | | | | 455/41.1 |
| 2013/0311762 | A1 | 11/2013 | Bank | |
| 2014/0337611 | A1 | 11/2014 | Kuscher | |
| 2015/0106456 | A1* | 4/2015 | van Hoek | H04L 67/14 |
| | | | | 709/206 |
| 2018/0131535 | A1* | 5/2018 | Johan | H04N 21/26208 |
| 2020/0036723 | A1 | 1/2020 | Ranchod | |

FOREIGN PATENT DOCUMENTS

| | | |
|---|---|---|
| CN | 108319483 A | 7/2018 |
| CN | 109857920 A | 6/2019 |
| CN | 109995877 A | 7/2019 |
| CN | 110162415 A | 8/2019 |
| CN | 110248228 A | 9/2019 |
| CN | 110302533 A | 10/2019 |
| CN | 110891013 A | 3/2020 |
| CN | 110929241 A | 3/2020 |
| JP | H10312286 | 11/1998 |

OTHER PUBLICATIONS

The EESR of EP application No. 21160786.6.
The first OA of the parallel KR application.
The first OA of the parallel JP application.
First Office Action of the priority application CN202010352015.X.
"Socket-based Programming Principle and Method of Internet", Journal of Chongqing University of Posts and Telecommunications, vol. 9, No. 4, Dec. 1997, pp. 57-73.

* cited by examiner

ACQUISITION METHOD, APPARATUS, DEVICE AND STORAGE MEDIUM FOR APPLET DATA

CROSS-REFERENCE TO RELATED APPLICATION

This application claims priority to Chinese Patent Application No. 202010352015.X, filed on Apr. 28, 2020, which is hereby incorporated by reference in its entirety.

TECHNICAL FIELD

The embodiments of the present application relate to the field of the Internet of Things (IoT) in computer technology, and in particular, to an acquisition method, apparatus, device and storage medium for applet data.

BACKGROUND

An applet is entirely an offline H5 application, and with continuous development of the mini program ecology, more and more applications have become applets.

Since an applet is an offline solution whose first data request does not have connection reuse available, a client in a terminal needs to establish a network connection with a data server before sending the first data request. However, the network connection establishment process takes a lot of time, which will result in low efficiency in applet data acquisition.

SUMMARY

The embodiments of the present application provide an acquisition method, apparatus, device and storage medium for applet data, which can improve the acquisition efficiency of applet data.

In a first aspect, an embodiment of the present application provides an acquisition method for applet data applied to a terminal, and the method may include:

establishing a network connection with a data server according to an interface address of the data server corresponding to an applet when a trigger operation for starting the applet is detected;

sending a data request message to the data server through the network connection after the applet is started;

receiving, from the data server, a data response message that contains requested data.

In a second aspect, an embodiment of the present application provides an acquisition method for applet data applied to a data server, and the method may include:

establishing a network connection with a terminal according to an interface address of a data server corresponding to the applet when a trigger operation for starting the applet is detected by the terminal;

receiving, from the terminal, a data request message through the network connection; where the data request message is sent by the terminal after the applet is started;

sending, to the terminal, a data response message that contains requested data.

In a third aspect, an embodiment of the present application provides an acquisition apparatus for applet data, including:

a processing module, configured to establish a network connection with a data server according to an interface address of the data server corresponding to the applet when a trigger operation for starting the applet is detected;

a sending module, configured to send a data request message to the data server through the network connection after the applet is started;

a receiving module, configured to receive, from the data server, a data response message that contains requested data.

In a fourth aspect, an embodiment of the present application provides an acquisition apparatus for applet data, including:

a processing module, configured to establish a network connection with a terminal according to an interface address of a data server corresponding to an applet when a trigger operation for starting the applet is detected by the terminal;

a receiving module, configured to receive, from the terminal, a data request message through the network connection; and the data request message is sent by the terminal after the applet is started;

a sending module, configured to send, to the terminal, a data response message that contains requested data.

In a fifth aspect, an embodiment of the present application provides an electronic device, including:

at least one processor; and a memory communicatively connected with the at least one processor; where, the memory stores instructions for execution by the at least one processor, characterized in that the instructions, when executed by the at least one processor, cause the at least one processor to perform the acquisition method for applet data according to the first aspect; or characterized in that the instructions, when executed by the at least one processor, cause the at least one processor to perform the acquisition method for applet data according to the second aspect.

In a sixth aspect, an embodiment of the present application also provides a non-transitory computer-readable storage medium having stored thereon computer instructions used to cause the computer to perform the acquisition method for applet data according to the first aspect, or used to cause the computer to perform the acquisition method for applet data according to the second aspect.

The technical solutions provided by the embodiments of the present application are different from the prior art in that: the network connection is established with the data server according to the interface address of the data server corresponding to the applet when a trigger operation for starting the applet is detected rather than when the first data request is sent. Thus, after the applet is started, a data request message can be sent to the data server directly through the pre-established network connection, and a data response message containing the requested data can be received from the data server. Therefore, excessive time consumption caused by failing to pre-establish network connection before the first data request is sent can be avoided, and the acquisition efficiency of applet data can be improved.

It should be understood that what is described herein are not intended to identify key or important features of the embodiments of the present disclosure, nor are they used to limit the scope of the present disclosure, and other features of the present disclosure will become apparent from the following description.

BRIEF DESCRIPTION OF THE DRAWINGS

The accompanying drawings are used for better understanding of the solution and do not constitute a limitation on the present application. In the drawings.

DESCRIPTION OF EMBODIMENTS

The exemplary embodiments of the present application are described below with reference to the accompanying drawings, including various details of the embodiments of the present application that are useful for understanding the present application, and should be considered as merely exemplary. Therefore, those of ordinary skill in the art should realize that various changes and modifications can be made to the embodiments described herein without departing from the scope and spirit of the present application. Likewise, for clarity and conciseness purposes, descriptions of well-known functions and structures are omitted in the following description.

In the embodiments of the present application, "at least one" refers to one or more, and "multiple" refers to two or more. "And/or" describes the association relationship of associated objects, and indicates that there may be three kinds of relationships; for example, "a and/or b" may indicate: there is "a" only, there are both "a" and "b", there is "b" only, and "a" and "b" can be singular or plural. In the textual description of the present application, the character "/" generally indicates that the associated objects are in an "or" relationship.

Figure 1:
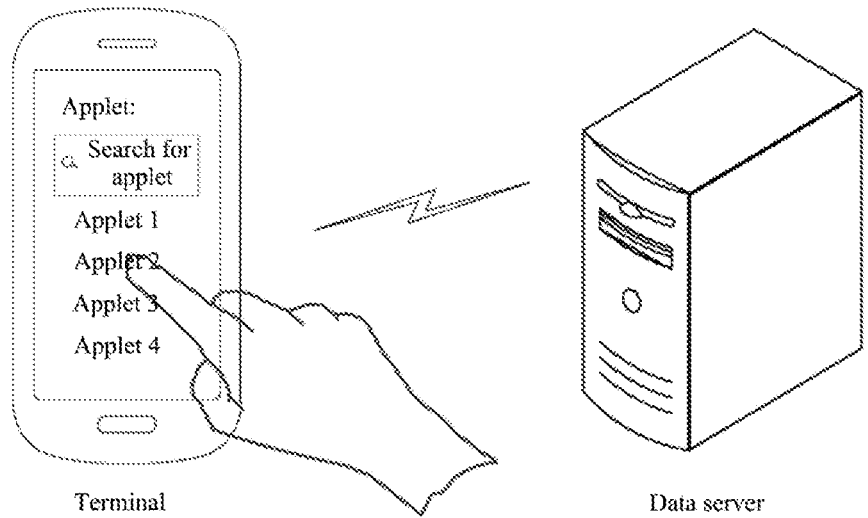
FIG. 1 is a scenario diagram applicable to an acquisition method for applet data according to an embodiment of the present application.

The acquisition method for applet data provided by the embodiment of the present application can be applied to scenarios where applets are applied. For example, as shown in FIG. 1, FIG. 1 is a scenario diagram that can implement an acquisition method for applet data according to an embodiment of the present application. The scenario shown in FIG. 1 includes a terminal and a data server, and data interaction can be performed between the terminal and the data server. When the terminal clicks on the applet 2 in the client to start the applet 2, no connection reuse is available for the first data request because the applet 2 is an offline solution, so that it is necessary to establish a network connection with the data server when the first data request is sent. However, excessive time consumption caused by establishing network connection will result in low data acquisition efficiency for the applet 2.

To improve the acquisition efficiency of applet data, the embodiment of the present application provides an acquisition method for applet data, which is different from the prior art in that: the network connection is established with the data server according to the interface address of the data server corresponding to the applet when a trigger operation for starting the applet is detected rather than when the first data request is sent. Thus, after the applet is started, a data request message can be sent to the data server directly through the pre-established network connection, and a data response message containing the requested data can be received from the data server. Therefore, excessive time consumption caused by failing to pre-establish network connection before the first data request is sent can be avoided, and the acquisition efficiency of the applet data can be improved.

It should be noted that in the embodiments of the present application, an interaction process with the data server can be understood as being executed by a client in a terminal; and in the following description, an interaction process with a service server can also be understood as being executed by a client in a terminal. There may be multiple applets corresponding to an client, and the applet involved in the embodiments of the present application may be any one of the multiple applets. For example, as shown in FIG. 1, there may be at least four applets corresponding to a certain client, that is, applet 1, applet 2, applet 3 and applet 4.

The terminal is also referred to as user equipment. For example, the terminal may be a mobile phone, a tablet computer, a notebook computer, a palmtop computer, a mobile internet device (MID), a wearable device, a virtual reality (VR) device, an augmented reality (AR) device, etc.

The acquisition method for applet data provided by the present application will be described in detail below through specific embodiments. It is understandable that the following specific embodiments can be combined with each other, and the same or similar concepts or processes may not be repeated in some embodiments.

Embodiment I

Figure 2:
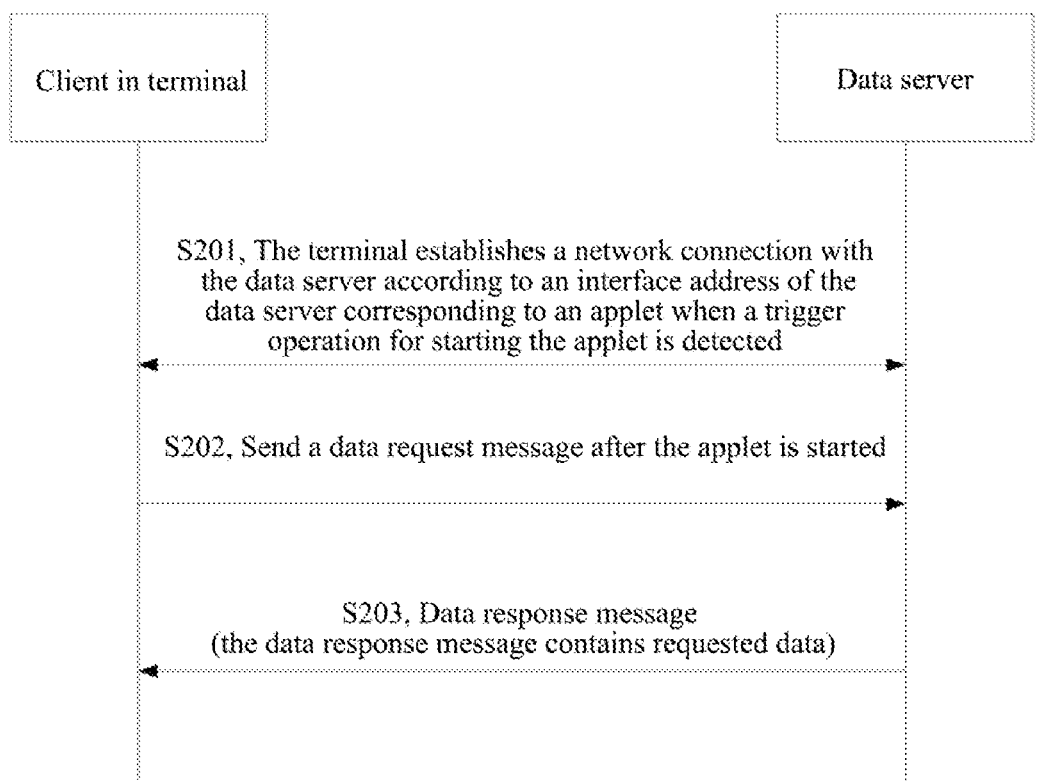
FIG. 2 is a schematic flowchart of an acquisition method for applet data according to Embodiment I of the present application.

FIG. 2 is a schematic flowchart of an acquisition method for applet data according to Embodiment I of the present application; for example, as shown in FIG. 2, the acquisition method for applet data may include:

S201, The terminal establishes a network connection with a data server according to an interface address of the data server corresponding to the applet when a trigger operation for starting the applet is detected.

For example, the trigger operation can be a click operation, a touch operation, or a sliding operation, etc., as long as it can be used to start an applet.

When the trigger operation for starting the applet is detected, the client in the terminal needs to first determine the interface address of the data server corresponding to the applet, and then a network connection with the data server can be established according to the interface address of the data server. For example, when determining the interface address of the data server, the client in the terminal can first acquire a manifest file corresponding to the applet, locally, where the manifest file contains the interface address of the data server corresponding to the applet. In this way, the client in the terminal can establish the network connection with the data server according to the interface address of the data server.

For example, the manifest file may be an app.json file for describing a pre-connection configuration. When the manifest file is an app.json file, the interface address of the data server can be recorded in the app.json file as an array. When the client establishes a network connection between the interface address of the data server and the data server, considering the time consumption problem in the startup process, only the first item in the array is typically acquired as the interface address of the data server. At present, when a network connection is established between the interface address of a data server and the data server, the interface addresses of at most two data servers can be pre-connected at the same time. Of course, the interface addresses of more data servers can also be pre-connected at the same time, and more specifics can also be determined according to the operating condition of the client. For example, the maximum number for the pre-connection can be selected according to memory capacity. Understandably, when interface addresses of multiple data servers are pre-connected at the same time, the multiple interface addresses all correspond to the data server, albeit their description methods are different.

After acquiring the interface address of the data server corresponding to the applet, the client can establish a network connection with the data server according to the interface address of the data server corresponding to the applet. For example, in the case of establishing the network connection with a data server, the client can find the corresponding data server according to the interface address of the data server, and send a network connection request message to the data server, so as to request a network connection with the data server through the network connection request message. Correspondingly, after receiving the network connection request message, the data server can establish a network connection with the terminal, and send, after the network connection is established, a network connection response message to the terminal to indicate that the network connection has been established, so that a network connection is established between the client and the data server.

When the client sends a network connection request message to the data server, for example, the network connection request message can be an empty request message. That is, the client requests to establish a network connection with the data server through the empty request message. It is understandable that in the embodiments of the present application, an empty request message is used to request to establish a network connection with the data server for the sole purpose of reducing data interaction and resource occupation. Of course, the network connection request message can also be a non-empty request message configured as needed. In the embodiments of the present application, the case that the network connection request message can be an empty request message is only illustrated as an example, but does not constitute a limitation on the embodiments of the present application. For example, the implementation of the empty request message can be determined according to the service deployment of the data server. For example, the empty request message can be a HEAD request, a GET request, or an OPTION request.

In the embodiments of the present application, when a trigger operation for starting the applet is detected by the client in the terminal, a network connection with the data server is established in advance according to the interface address of the data server corresponding to the applet. Thus, after the applet is started, data can be directly requested from the data server through the pre-established network connection, that is, the following S202 and S203 can be performed. Therefore, excessive time consumption caused by failing to pre-establish network connection before the first data request is sent can be avoided, and the acquisition efficiency of applet data can be improved.

S202, The terminal sends a data request message to the data server through the network connection after the applet is started.

The data request message is used to request the data server to return the requested data.

Since the client in the terminal has established a network connection with the data server in advance, after the applet is started, the data request message requesting for the first data can be directly sent to the data server through the pre-established network connection. Correspondingly, after receiving the data request message sent by the client in the terminal, the data server searches for the requested data, and then carries the requested data in the data response message and sends it to the client in the terminal.

S203, The data server sends a data response message to the terminal.

The data response message contains the requested data, so that the client in the terminal can acquire the requested data.

It can be seen that the acquisition method for applet data provided by the embodiment of the present application is different from the prior art in that: the network connection is established with the data server according to the interface address of the data server corresponding to the applet when the trigger operation for starting the applet is detected rather than when the first data request is sent. Thus, after the applet is started, a data request message can be sent to the data server directly through the pre-established network connection, and a data response message containing the requested data can be received from the data server can be received. Therefore, excessive time consumption caused by failing to pre-establish network connection before the first data request is sent can be avoided, and the acquisition efficiency of applet data can be improved.

Based on the embodiment shown in FIG. 2 above, when a trigger operation for starting the applet is detected by the client in the terminal, a network connection with the data server is established in advance according to the interface address of the data server corresponding to the applet, so that after the applet is started, data can be directly requested from the data server through the pre-established network connection, Therefore, excessive time consumption caused by failing to pre-establish network connection before the first data request is sent can be avoided, and the acquisition efficiency of applet data can be improved. It can be seen that before the client requests data from the data server through the pre-established network connection, it needs to verify with a service server that the applet has actually started. In addition, after receiving the requested data, the client can further process the requested data through the service server and display the requested data that has been processed. The following will describe in more detail through Embodiment II.

Embodiment II

Figure 3:
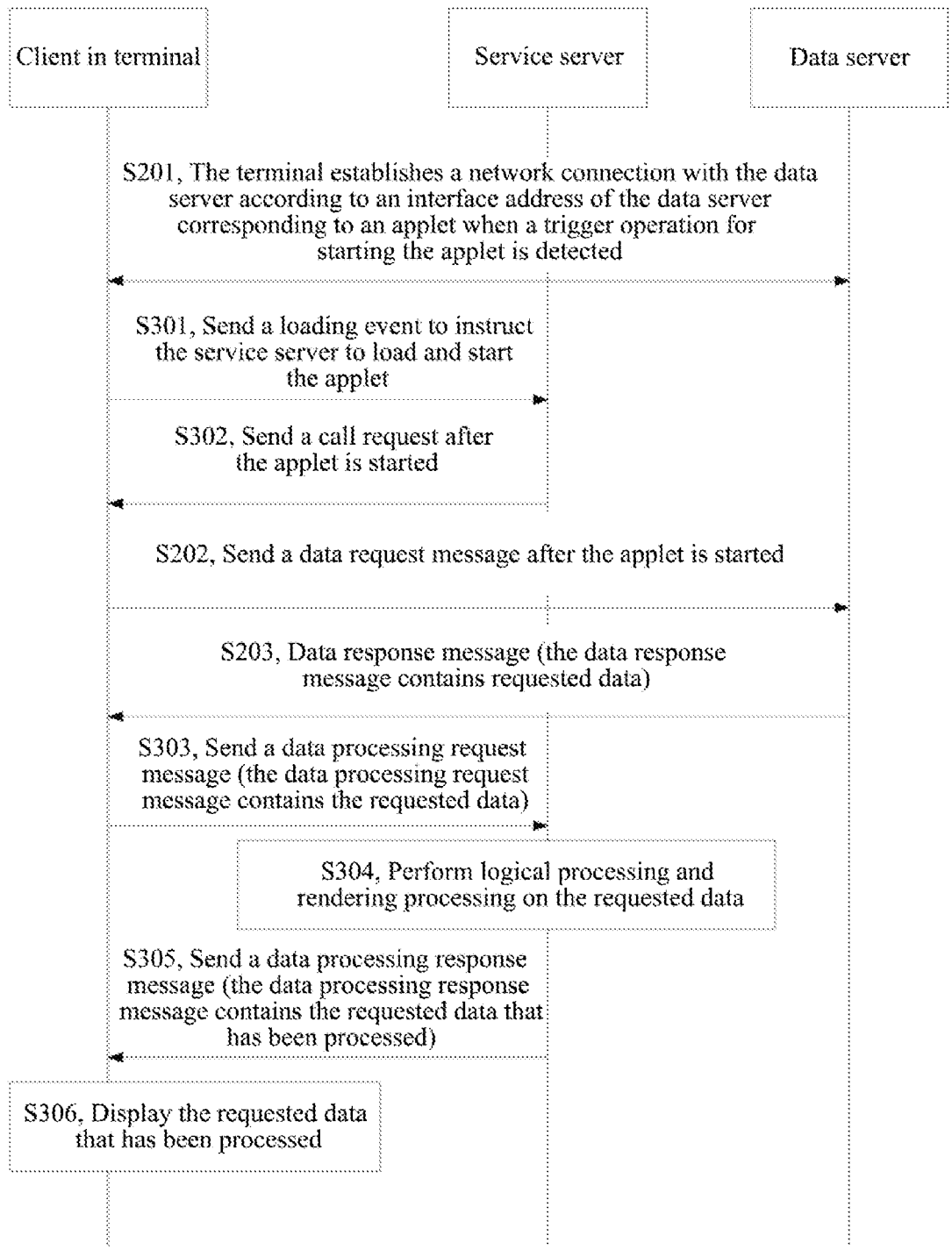
FIG. 3 is a schematic flowchart of an acquisition method for applet data according to Embodiment II of the present application.

FIG. 3 is a schematic flowchart of an acquisition method for applet data according to Embodiment II of the present application. For example, as shown in FIG. 3, the acquisition method for applet data may further include:

S301, The client in the terminal sends a loading event to the service server corresponding to the applet.

The loading event is used to instruct the service server to load and start the applet.

For example, the client in the terminal may send a loading event to the service server by: the client first sends a first loading event, e.g., an AppReady&PageReady loading event, to a front-end framework module in a service server, where the first loading event is used to instruct on loading the applet service code app.js; correspondingly, the front-end framework module in the service server sends a second loading event, e.g., an app.json loading event, to a service code module in the service server according to the first loading event, so that the service code module in the service server starts the applet according to the second loading event. After the service code module in the service server starts the applet according to the second loading event, the front-end framework module in the service server issues a first life cycle event App.onLaunch. It should be noted that the first life cycle event on the client is merely taken as an example herein, and in fact, most developers may choose to trigger Page.onLoad( ) which is the first life cycle of a page.

It is understandable that in the embodiment of the present application, the operation in the above step S201, i.e., establishing a network connection between the client in the terminal and the data server according to the interface address of the data server corresponding to the applet, can be performed simultaneously with the step S301, i.e., sending, by the client, a loading event to the service server corresponding to the applet. This can reduce the processing time because the service server can handle applet loading and running operations in parallel, and enable the above two operations to be carried out independently. This may also guarantee, to a certain extent, that the network request connection triggered by a real service in the App.onLaunch or Page.onLoad life cycle can reuse the network connection established in advance. It is expected to solve the problems in existing applet solution compared with the H5 solution, thus achieving the purpose of performance enhancement.

After the front-end framework module in the service server issues the first life cycle event of App.onLaunch, the service code module in the service server will send a call request, e.g., a request API, to the client through the front-end framework module in the service server to instruct the client to send a data request to the data server, that is, to perform the following S302:

S302, The service server sends a call request to the client in the terminal.

The call request is used to instruct the terminal to send a network connection request message to the data server.

After receiving the call request from the service server, the client determines, according to the call request, that the applet has been started, and performs the above S202 and S203, that is, the client in the terminal sends a data request message to the data server directly through the pre-established network connection, and receives a data response message from the data server, where the data response message contains the requested data. Therefore, excessive time consumption caused by failing to pre-establish network connection when the first data request is sent can be avoided, and the acquisition efficiency of applet data can be improved.

After the requested data sent by the data server has been received by the client in the terminal, the following S303 to S306 may be performed to display the requested data to the user.

S303, The client in the terminal sends a data processing request message to the service server.

The data processing request message contains the requested data and is used to instruct the service server to perform logical processing and rendering processing on the requested data.

The client sends the requested data to the service code module in the service server through the front-end framework module in the service server, so that the service code module in the service server performs logical processing and rendering processing on the requested data; Correspondingly, after receiving the data processing request message, the service server performs logical processing and rendering processing on the requested data, that is, the following S304 is performed:

S304, The service server performs logical processing and rendering processing on the requested data.

For example, when the service server performs logical processing and rendering processing on the requested data, the service code module in the service server may first call the data-driven rendering API (setData) provided by the front-end framework module in the service server, and to drive, based on the data, the rendering API to trigger a rendering layer in the service server to perform content rendering processing, so as to acquire the requested data that has been processed.

S305, The service server sends a data processing response message to the client in the terminal.

The data processing response message contains the requested data that has been processed.

For example, when the service server sends a data processing response message to the client in the terminal, since the rendering processing of the requested data is performed by the service code module in the service server, it is the service code module in the service server that sends the requested data that has been rendered to the client through the front-end framework module in the service server after the service code module in the service server finishes the rendering processing on the requested data and acquires the requested data that has been processed correspondingly, so that the client receives the requested data that has been processed.

S306, The client displays the requested data that has been processed.

After the requested data that has been processed are received by the client, the requested data can be directly displayed on the display screen for users to view.

It can be seen that in the acquisition method for the applet data provided by the embodiment of the present application, since a network connection is pre-established with the data server by the client, after the applet is started, the requested data can be acquired from the data server through the pre-established network connection, and then the requested data is sent to the service server, so as to receive logical processing and rendering processing on the requested data through the service server. In this way, the client can directly display the requested data that has been processed on the display screen for the user to view. In the whole process, the network connection between the client and the data server is pre-established, thus excessive time consumption caused by failing to pre-establish network connection before the first data request is sent can be avoided, and the acquisition efficiency of applet data can be improved.

Embodiment III

Figure 4:
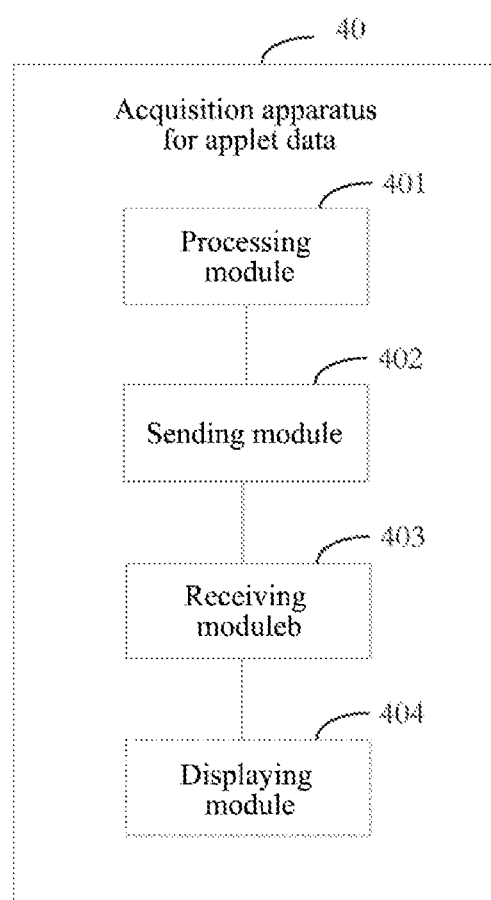
FIG. 4 is a schematic structural diagram of an acquisition apparatus for applet data according to Embodiment III of the present application.

FIG. 4 is a schematic structural diagram of an acquisition apparatus 40 for applet data according to Embodiment III of the present application. For example, as shown in FIG. 4, the acquisition apparatus 40 for the applet data may include:

a processing module 401, configured to establish a network connection with a data server according to an interface address of the data server corresponding to an applet when a trigger operation for starting the applet is detected.

a sending module 402, configured to send a data request message to the data server through the network connection after the applet is started.

a receiving module 403, configured to receive, from the data server, a data response message that contains requested data.

Optionally, the sending module 402 is further configured to send a network connection request message to the data server according to the interface address of the data server.

The receiving module is further configured to receive, from the data server, a network connection response message that is used to indicate that the network connection has been established.

Optionally, the network connection request message is an empty request message.

Optionally, the acquisition apparatus 40 for the applet data further includes a display module 404.

The sending module 402 is further configured to send, to the service server corresponding to the applet, a data processing request message that contains the requested data and is used to instruct the service server to perform logical processing and rendering processing on the requested data.

The receiving module is further configured to receive, from the service server, a data processing response message that contains requested data that has been processed.

The display module 404 is configured to display the requested data that has been processed.

Optionally, the sending module 402 is further configured to send a loading event to the service server, and the loading event is used to instruct the service server to load and start the applet.

The receiving module is further configured to receive a call request from the service server, and the call request is used to instruct the terminal to send the network connection request message to the data server.

Optionally, the processing module 401 is further configured to acquire a manifest file corresponding to the applet locally, and the manifest file contains the interface address of the data server corresponding to the applet.

The acquisition apparatus 40 for the applet data provided by the embodiments of the present application can perform the technical solution of the acquisition method for the applet data on the terminal side in any of the above embodiments, and its implementation principle and beneficial effects are similar to those of the acquisition method for the applet data, so that reference can be made to the implementation principle and beneficial effects of the acquisition method for the applet data, which will not be repeated herein.

Embodiment IV

Figure 5:
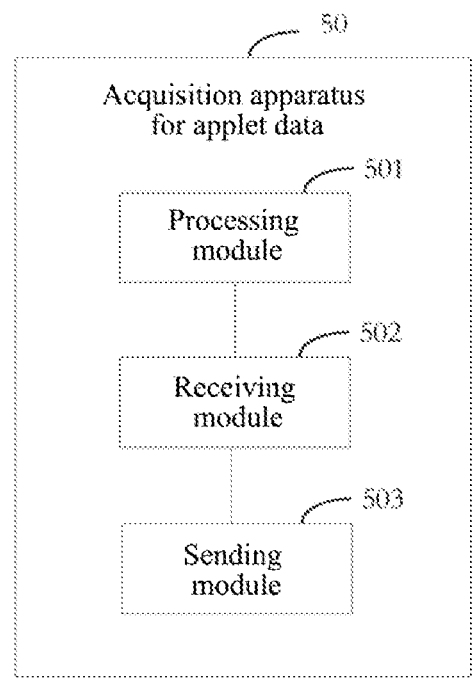
FIG. 5 is a schematic structural diagram of an acquisition apparatus for applet data according to Embodiment IV of the present application.

FIG. 5 is a schematic structural diagram of an acquisition apparatus 50 for applet data according to Embodiment IV of the present application. For example, as shown in FIG. 5, the acquisition apparatus 50 for applet data may include:

a processing module 501, configured to establish a network connection with a terminal according to an interface address of the data server corresponding to the applet when a trigger operation for starting the applet is detected.

a receiving module 502, configured to receive, from the terminal, a data request message through the network connection; and the data request message is sent by the terminal after the applet is started.

a sending module 503, configured to send, to the terminal, a data response message that contains requested data.

Optionally, the receiving module 502 is further configured to receive a network connection request message from the terminal.

The sending module 503 is further configured to send, to the terminal, a network connection response message that is used to indicate that the network connection has been established.

Optionally, the network connection request message is an empty request message.

The acquisition apparatus 50 for the applet data provided by the embodiments of the present application can perform the technical solution of the acquisition method for the applet data on the data server side in any of the above embodiments, and its implementation principle and beneficial effects are similar to those of the acquisition method for the applet data, so that reference can be made to the implementation principle and beneficial effects of the acquisition method for the applet data, which will not be repeated herein.

According to an embodiment of the present application, the present application also provides an electronic device and a readable storage medium.

Figure 6:
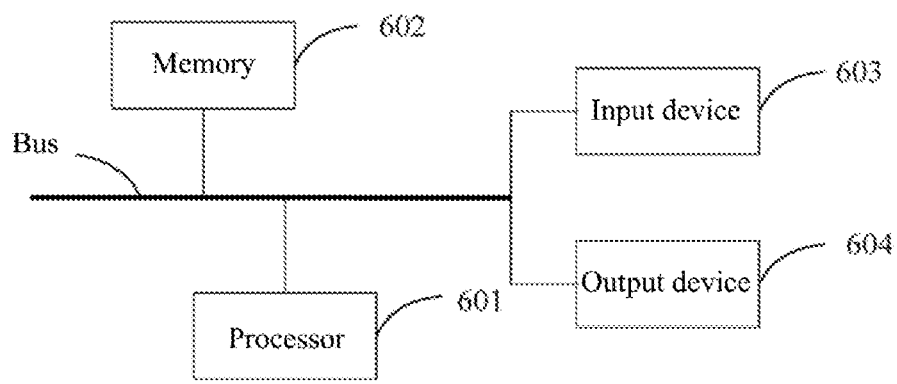
FIG. 6 is a block diagram of an electronic device according to an acquisition method for applet data according to an embodiment of the present application.

As shown in FIG. 6, FIG. 6 is a block diagram of an electronic device according to an acquisition method for applet data according to an embodiment of the present application. The electronic devices represent various forms of digital computers, such as laptop computers, desktop computers, workstations, personal digital assistants, servers, blade servers, mainframe computers, and other suitable computers. The electronic devices may also represent various forms of mobile devices, such as personal digital assistants, cellular phones, smart phones, wearable devices, and other similar computing devices. The components shown herein, their connections and relationships, and their functions are merely examples, and are not intended to limit the implementation of the present application described and/or required herein.

As shown in FIG. 6, the electronic device includes: one or more processors 601, a memory 602, and interfaces for connecting various components including a high-speed interface and a low-speed interface. The various components are connected to each other by using different buses, and can be installed on a common motherboard or be installed in other ways as required. The processor can process the instructions executed in the electronic device, it includes instructions stored in or on the memory to display graphical information of the GUI on an external input/output device (e.g., a display device coupled to the interface). In other embodiments, if necessary, multiple processors and/or multiple buses may be used together with multiple memories. Likewise, multiple electronic devices can be connected, and each of them provides some necessary operations (for example, serving as a server array, a group of blade servers, or a multi-processor system). There is only one processor 601 in FIG. 6.

The memory 602 is the non-transitory computer-readable storage medium provided by the present application. The memory stores instructions that can be executed by at least one processor, so that the at least one processor performs the acquisition method for applet data provided by the present application. The non-transitory computer-readable storage medium of the present application stores computer instructions that are used to make a computer perform the acquisition method for applet data provided by the present application.

As a non-transitory computer-readable storage medium, the memory 602 can be used to store non-transitory software programs, non-transitory computer executable programs and modules, e.g., the program instructions/modules corresponding to the acquisition method for applet data according to the embodiment of the present application (for example, the processing module 401, the sending module 402, the receiving module 403 and the display module 404 shown in FIG. 4; or the processing module 501, the receiving module 502 and the sending module 503 shown in FIG. 5). The processor 601 runs non-transitory software programs, instructions and modules stored in the memory 602 to perform various functional applications of the server as well as data processing, that is, to perform the acquisition method for applet data according to the above method embodiments.

The memory 602 may include a program storage area and a data storage area, the program storage area can store the operating system, and the application program required by at least one function; the data storage area can store data created by the use of the electronic device according to the acquisition method for applet data, etc. In addition, the memory 602 may include a high-speed random access memory, and may also include a non-transitory memory, such as at least one magnetic disk storage device, flash memory device, or other non-transitory solid state storage device. In some embodiments, the memory 602 optionally includes a memory remotely provided with respect to the processor 601, and these remote memories can be connected to the electronic device of the acquisition method for applet data through the network. Examples of the above networks include, but are not limited to, the Internet, corporate intranets, local area networks, mobile communication networks, and combinations thereof.

The electronic device for the acquisition method for applet data may further include: an input device 603 and an output device 604. The processor 601, the memory 602, the input device 603, and the output device 604 may be connected by a bus or in other ways, and the connection by a bus is taken as an example in FIG. 6.

The input device 603 can receive the input number or character information, and generate key signal input related to the user settings and function control of the electronic device of the acquisition method for applet data, e.g., a touch screen, a keypad, a mouse, a trackpad, a touchpad, a pointing stick, one or more mouse buttons, a trackball, a joystick and other input devices. The output device 604 may include a display device, an auxiliary lighting device (e.g., a light emitting diode (LED)), a tactile feedback device (e.g., a vibration motor), etc. The display device may include, but is not limited to, a liquid crystal display (LCD), an LED display and a plasma display. In some embodiments, the display device may be a touch screen.

Various implementations of the system and technology described herein can be implemented in digital electronic circuit systems, integrated circuit systems, application specific integrated circuits (ASICs), computer hardware, firmware, software, and/or combinations thereof. These various implementations can be implemented in one or more computer programs that may be executed and/or interpreted on a programmable system including at least one programmable processor. The programmable processor can be a dedicated or general programmable processor, and such programmable processor can receive data and instructions from, and transmit data and instructions to, a storage system, at least one input device and at least one output device.

These computing programs (also referred to as programs, software, software applications or codes) include machine instructions for programmable processors, and can be implemented using the high-level process and/or object-oriented programming language, and/or assembly/machine language. As used herein, the terms "machine-readable medium" and "computer-readable medium" refer to any computer program product, device, and/or device used to provide machine instructions and/or data to a programmable processor (e.g., magnetic disk, optical disk, memory, programmable logic device (PLD)), including, a machine-readable medium that receives machine instructions as machine-readable signals.

In order to provide interaction with users, the system and technology described herein can be implemented on a computer that has: a display device used to display information to users (e.g., the Cathode Ray Tube (CRT) or LCD monitor); and a keyboard and a pointing device (e.g., a mouse or a trackball) through which the user can provide the input to the computer. There are other types of devices that can also be used to provide interaction with the users; for example, the feedback provided to the users can be any form of sensory feedback (e.g., visual feedback, auditory feedback, or tactile feedback); and any form (including sound input, voice input and tactile input) can be used to receive the input from the user.

The system and technology described herein can be implemented in a computing system that includes back-end components (e.g., a data server), or can be implemented in a computing system that includes middleware components (e.g., an application server), or can be implemented in a computing system that includes front-end components (e.g., a user computer with a graphical user interface or a web browser through which the user can interact with the implementation of the system and technology described herein), or can be implemented a computing system that includes any combination of such back-end components, middleware components, or front-end components. The components of the system can be connected to each other through any form or medium of digital data communication (e.g., a communication network). Examples of the communication network include: local area network (LAN), wide area network (WAN) and the Internet.

The computer system may include the clients and server, which are generally far away from each other and typically interact through a communication network. The relationship between the client and the server is generated by running the computer program that has a client-server relationship on the corresponding computer.

The technical solution provided by the embodiment of the present application is different from the prior art in that: the network connection is established with the data server according to the interface address of the data server corresponding to the applet when a trigger operation for starting the applet is detected rather than when the first data request is sent. Thus, after the applet is started, a data request message can be sent to the data server directly through the pre-established network connection, and a data response message containing the requested data can be received from the data server. Therefore, excessive time consumption caused by failing to pre-establish network connection before the first data request is sent can be avoided, and the acquisition efficiency of applet data can be improved.

It should be understood that the various forms of processes shown above can be reordered, and steps may be added or deleted. For example, the steps described in the present application can be performed in parallel, in sequence, or in a different orders, as long as the desired result of the technical solution disclosed in the present application can be achieved, which is not limited herein.

The foregoing specific implementations do not constitute a limitation on the scope of protection of the present application. Those skilled in the art should understand that various modifications, combinations, sub-combinations, and substitutions can be made according to design requirements and other factors. Any amendments, equivalent substitutions and improvements made within the spirit and principles of the present application shall be included in the scope of protection of the present application.

What is claimed is:

1. An acquisition method for applet data, wherein the acquisition method is applied to a terminal, the method comprising:
    establishing, by a client of the terminal, a network connection with a data server according to an interface address of the data server corresponding to an applet when a trigger operation for starting the applet is detected, wherein the client is associated with the applet, and sending, to a service server, a loading event that is used to instruct the service server to load and start the applet, wherein the establishing the network connection is performed simultaneously with the sending the loading event;
    sending a data request message to the data server through the network connection after the applet is started;
    receiving, from the data server, a data response message that contains requested data, wherein the method further comprising:
    sending a data processing request message to a service server corresponding to the applet, wherein the data processing request message contains the requested data and is used to instruct the service server to perform logical processing and rendering processing on the requested data;
    wherein when the service server performs logical processing and rendering processing on the requested data, a service code module in a service server first call a data-driven rendering Application Programming Interface (API)(setData) provided by a front-end framework module in the service server, and trigger, based on the data-driven rendering API, a rendering layer in the service server to perform content rendering processing, so as to acquire the requested data that has been processed.

2. The method of claim 1, wherein the establishing, by a client, a network connection with a data server according to an interface address of the data server corresponding to an applet comprises: sending, according to the interface address of the data server, a network connection request message to the data server; receiving, from the data server, a network connection response message that is used to indicate that the network connection has been established.

3. The method of claim 2, wherein: the network connection request message is an empty request message.

4. The method of claim 1, further comprising:
    receiving, from the service server, a data processing response message that contains the requested data that has been processed; displaying the requested data that has been processed.

5. The method of claim 4, further comprising:
    receiving, from the service server, a call request that is used to instruct the terminal to send a network connection request message to the data server.

6. The method of claim 1, further comprising: acquiring a manifest file corresponding to the applet locally, wherein the manifest file contains the interface address of the data server corresponding to the applet.

7. An acquisition method for applet data, wherein the acquisition method is applied to a data server, the method comprising:
    establishing a network connection with a client of a terminal, wherein the network connection is established according to an interface address of a data server corresponding to an applet when a trigger operation for starting the applet is detected by the terminal, wherein the client is associated with the applet, wherein a loading event, which is used to instruct a service server to load and start the applet, is sent from the client to the service server, and
    wherein the establishing the network connection is performed simultaneously with the sending the loading event;
    receiving, from the terminal, a data request message through the network connection, wherein the data request message is sent by the terminal after the applet is started;
    sending, to the terminal, a data response message that contains requested data, so that the terminal sends a data processing request message to a service server corresponding to the applet, wherein the data processing request message contains the requested data and is used to instruct the service server to perform logical processing and rendering processing on the requested data;
    wherein when the service server performs logical processing and rendering processing on the requested data, a service code module in a service server first call a data-driven rendering Application Programming Interface (API) (setData) provided by a front-end framework module in the service server, and trigger, based on the data-driven rendering API, a rendering layer in the service server to perform content rendering processing, so as to acquire the requested data that has been processed.

8. The method of claim 7, wherein the establishing a network connection with a client of a terminal comprises: receiving a network connection request message from the terminal; sending, to the terminal, a network connection response message that is used to indicate that the network connection has been established.

9. The method of claim 8, wherein: the network connection request message is an empty request message.

10. An acquisition apparatus for applet data, comprising: at least one processor; and a memory communicatively connected with the at least one processor, wherein the memory stores thereon instructions executable by the at least one processor, the instructions are executed by the at least one processor to enable the at least one processor to implement the method according to claim 1.

11. The apparatus of claim 10, wherein the at least one processor is further enabled to: send a network connection request message to the data server according to the interface address of the data server; receive, from the data server, a network connection response message that is used to indicate that network connection has been established.

12. The apparatus of claim 11, wherein: the network connection request message is an empty request message.

13. The apparatus of claim 10, wherein the apparatus further comprises a displayer; the at least one processor is further enabled to:
    receive, from the service server, a data processing response message that contains the requested data that has been processed; and the displayer is configured to display the requested data that has been processed.

14. The apparatus of claim 13, wherein the at least one processor is further enabled to:

receive, from the service server, a call request that is used to instruct the terminal to send a network connection request message to the data server.

15. The apparatus of claim 10, wherein the at least one processor is further enabled to: acquire a manifest file corresponding to the applet locally, wherein the manifest file contains the interface address of the data server corresponding to the applet.

16. An acquisition apparatus for applet data, comprising: at least one processor; and a memory communicatively connected with the at least one processor, wherein the memory stores thereon instructions executable by the at least one processor, the instructions are executed by the at least one processor to enable the at least one processor to implement the method according to claim 7.

17. The apparatus of claim 16, wherein the at least one processor is further enabled to: receive a network connection request message from the terminal; send, to the terminal, a network connection response message that is used to indicate that the network connection has been established.

18. The apparatus of claim 17, wherein: the network connection request message is an empty message.

19. A non-transitory computer-readable storage medium storing computer instructions, wherein the computer instructions are used to cause the computer to perform the acquisition method for applet data according to claim 1.

20. A non-transitory computer-readable storage medium storing computer instructions, wherein the computer instructions are used to cause the computer to perform the acquisition method for applet data according to claim 7.

* * * * *